May 5, 1964
S. VEGA ETAL
3,131,869
COOLANT DEVICE FOR MACHINE TOOLS
Filed April 2, 1962
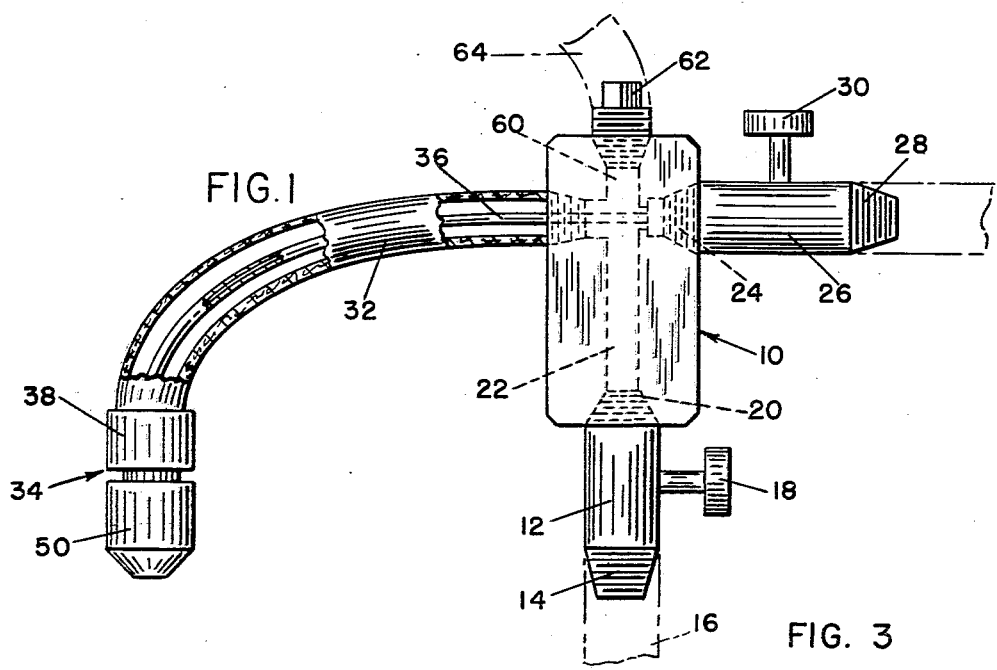
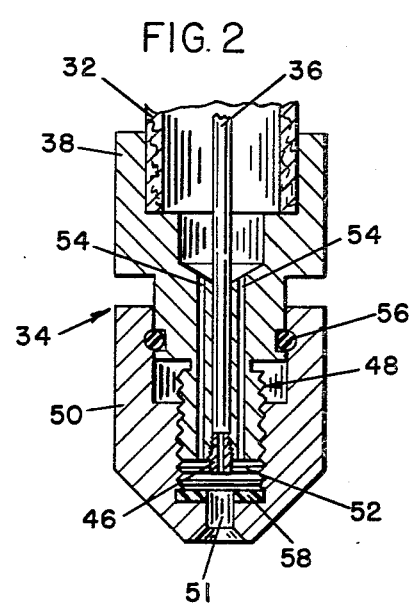
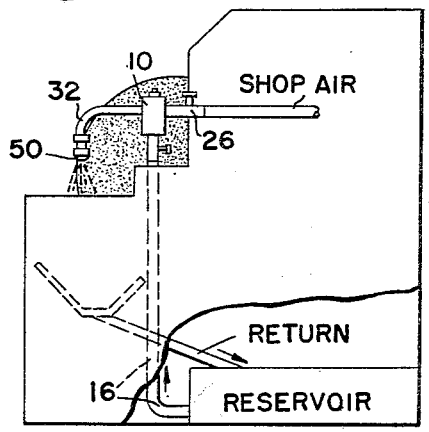
INVENTORS
SEBASTIAN VEGA
SAMUEL G. WALKER
ATTORNEY 3,131,869
COOLANT DEVICE FOR MACHINE TOOLS
Sebastian Vega, Needham, and Samuel G. Walker, Ashland, Mass. (both % V & W Machine Products Inc., 1015 Central Ave., Needham 92, Mass.)
Filed Apr. 2, 1962, Ser. No. 184,223
1 Claim. (Cl. 239—413)

This invention relates to a coolant device for machine tools and it is particularly directed to a new and improved mixing nozzle, said nozzle having a support with threaded inlet pipes and cooling valves theeron, said inlet pipes being adapted to be connected to existing plumbing for the coolant material for any kind of machine tool and also to the shop air, the air being utilized to atomize the coolant material to form a fine spray, and the valves being utilized to vary the spray by restricting the amount of air or the amount of oil utilized, it being apparent that either one or the other of the valves may be shut off so that the mixing nozzle may be used with or without the air and may be used with or without the oil; or the air and oil may be used together in any selected volume or pressures in order to provide different kinds of spray for the purpose of improving the coolant qualities of the already existing system of the machine tool.

The invention further relates to arrangements and combinations of parts which will be hereinafter described and more particularly set forth in the appended claim.

Reference is to be had to the accompanying darwings, in which

FIG. 1 is a view in side elevation, partly in section, illustrating the invention, FIG. 2 is a section through the nozzle on an enlarged scale, and FIG. 3 is a diagrammatic view showing the relation of the nozzle to a machine tool.

In carrying out the present invention there is provided a fixture generally indicated at 10, this fixture being in the form of a block. This fixture may be mounted or applied to a machine frame in any way or position desired but a simple way to mount it in position is to provide an inlet pipe 12 which may be threaded as at 14 and mounted directly on an existing pipe 16 for which the conventional reservoir for the coolant material on all kinds of machine tools is provided. The inlet pipe 12 is provided with a needle valve or the like operated by a handle 18 and the inlet pipe 12 may be tapped into the block 10 as at 20. This will mount the block 10 in the position desired but of course the block 10 may be mounted in any other way and connected to the hose 16 which does not necessarily act as a support therefor. The inlet pipe 12 communicates with a passage in the block at 22.

Another inlet is tapped at 24 for a pipe 26 threaded at 28 and connected to the shop air supply. The pipe 26 may also have a needle valve 30 for adjusting the volume of air or for shutting it off, and it is pointed out that the valves 18 and 30 may be similar and may act as shut-off valves and also as metering valves.

The passage 22 is connected to an outlet pipe 32 e.g., woven flexible metal hose or pipe having at an end thereof a nozzle generally indicated at 34. The pipe 26 is connected to a thin plastic tubing or the like which is indicated at 36 and is contained within the pipe 32 as clearly shown, so that it will be seen that the air that enters the pipe fitting 26 passes under pressure through the thin tube 36 to the end of the nozzle 34 and the oil or other coolant which is provided under pressure in the pipe 12 surrounds the same.

The nozzle itself is shown in detail in FIG. 2.

As is well known, a finely divided spray will provide far more coolant than the same amount of fluid used in a stream. These sprays are sometimes referred to as "fogs" and reduce the surrounding temperature very rapidly and to a much greater degree than is possible with an air coolant fluid. However, it is pointed out that various adjustments of the nozzle can be used for different spray patterns as is well known to those skilled in the art, and also the device may be used with or without the air or also with or without the coolant oil, or the coolant oil and the air may be utilized in any proportions desired.

Furthermore, the plumbing may pass completely through the block as indicated by passage 60 but shown here stopped by a plug 62. Plug 62 may be removed and piping 64 may be threaded into the block to communicate with passage 22, such piping being then connected to further blocks 10 as by means of like inlet ports, so that these devices are seen to be capable of use in gangs and area easily coupled together but still using the existing plumbing for the coolant which is found in all types of machine tools and also the conventional shop air which is always present.

There is an adapter 38 secured to the end of the hose or pipe 32 and this adapter has a central passage in it for reception of the small plastic air hose which extends through the adapter and is secured in position by a taper threaded insert 46 having a hole through it for passage of the air. The adapter is externally threaded at 48 to adjustably receive the nozzle tip 50 having a spray exit 51 and forming internally the chamber at 52 to receive the fluid coolant through a series of passages 54 through the adapter. An O-ring 56 seals off any back flow of coolant, and a gasket 58 acts as a seal to completely shut off the coolant when the tip 50 is screwed up to its uppermost position in FIG. 2, thus allowing only air to flow. This tip adjustment also acts to meter the coolant by proper turning of the tip.

FIG. 3 shows the relationship of the new nozzle etc. to a conventional machine tool, in this case a grinder.

Having thus described our invention and the advantages thereof, we do not wish to be limited to the details herein disclosed, otherwise than as set forth in the claim, but what we claim is:

The combination of a machine tool having a coolant reservoir and plumbing therefor, said plumbing including a pipe conducting coolant, with a coolant spray device comprising a conventional source of air under pressure as found in any conventional machine shop and including a fixture in the form of a block, a passage through the block, a second passage through the block, said passages inutersecting, said passages terminating in threaded portions, a delivery hose threaded at one end into one of the threaded portions of the first passage, a spray nozzle at the other end of the delivery hose, a smaller tube extending through said hose and through the first passage and into the nozzle, a connection threaded into the other threaded portion of said first passage, said tube being connected to the source of compressed air, a valve for the source to admit or shut off air to the tube, means mounting said block on the coolant-conducting pipe of the machine tool aforesaid at a threaded portion of the second passage, and a valve therefor, so that the coolant can be directed into said intersecting passages from the reservoir to the nozzle, and air under pressure can be directed through the spray nozzle with the coolant surrounding the tube in the nozzle to deliver coolant sprayed by air as controlled by said valves, said spray nozzle including an adapter connected directly to the hose, a nozzle tip, means to adjustably connect the tip to the adapter, a passage in the adapter for coolant flow, and a valve seat in the tip to open and close the passage in the adapter depending on the adjusted position of the tip relative to the adapter.

References Cited in the file of this patent

UNITED STATES PATENTS

| | | |
|---|---|---|
| 1,069,437 | Lambeth | Aug. 5, 1913 |
| 1,682,420 | Rolf | Aug. 28, 1928 |
| 2,824,363 | Norgren | Sept. 22, 1931 |
| 2,609,239 | Barton | Sept. 2, 1952 |
| 2,707,657 | Paasche | May 3, 1955 |
| 2,769,670 | Dunn | Nov. 6, 1956 |
| 2,850,323 | Veres | Sept. 2, 1958 |
| 2,868,584 | Faust | Jan. 13, 1959 |
| 2,893,645 | Johnson | July 7, 1959 |
| 2,895,684 | Harr | July 21, 1959 |